(12) United States Patent
Derrick et al.

(10) Patent No.: US 6,286,094 B1
(45) Date of Patent: Sep. 4, 2001

(54) METHOD AND SYSTEM FOR OPTIMIZING THE FETCHING OF DISPATCH GROUPS IN A SUPERSCALAR PROCESSOR

(75) Inventors: John Edward Derrick, Round Rock; Lee Evan Eisen, Austin; Hung Qui Le, Austin; Brian R. Konigsburg, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,663

(22) Filed: Mar. 5, 1999

(51) Int. Cl.[7] .............................. G06F 9/30; G06F 9/445
(52) U.S. Cl. ........................... 712/213; 712/212; 712/207
(58) Field of Search .................. 712/201, 23, 209, 712/212, 205, 210, 207, 211, 208, 213, 228, 242, 243, 258

(56) References Cited

U.S. PATENT DOCUMENTS

| | | | |
|---|---|---|---|
| 5,226,164 | * 7/1993 | Nadas et al. | 712/709 |
| 5,809,273 | * 9/1998 | Favor et al. | 712/210 |
| 5,822,575 | 10/1998 | Tran | 712/239 |
| 5,961,636 | 10/1999 | Brooks et al. | 712/228 |
| 6,032,244 | 2/2000 | Moudgill | 712/23 |
| 6,108,774 | 8/2000 | Muthusamy | 712/240 |

* cited by examiner

*Primary Examiner*—Daniel H. Pan
(74) *Attorney, Agent, or Firm*—Sawyer Law Group LLP; Anthony V. S. England

(57) ABSTRACT

A method and system for determining if a dispatch slot is required in a processing system is disclosed. The method and system comprises a plurality of predecode bits to provide routing information and utilizing the predecode bits to allow instructions to be directed to specific decode slots and to obey dispatch constraints without examining the instructions. The purpose of this precode encoding system scheme is to provide the most information possible about the grouping of the instructions without increasing the complexity of the logic which uses this information for decode and group formation. In a preferred embodiment, pre-decode bits for each instruction that may be issued in parallel are analyzed and the multiplexer controls are retained for each of the possible starting positions within the stream of instructions.

5 Claims, 5 Drawing Sheets

| BSFL | Meaning |
| --- | --- |
| 0000 | Normal |
| 0001 | Group Ending Instruction |
| 0010 | Group Beginning Instruction (First) |
| 0011 | Only |
| | |
| 0100 | Split |
| 0101 | Split and Group Ending |
| 0110 | Split and Group Beginning |
| 0111 | Split and Only |
| | |
| 1000 | Conditional Branch |
| 1001 | Unconditional Branch |
| 1010 | -- |
| 1011 | -- |
| | |
| 1100 | Microcode -    A |
| 1101 | -- |
| 1110 | -- |
| 1111 | -- |

METHOD AND SYSTEM FOR OPTIMIZING THE FETCHING OF DISPATCH GROUPS IN A SUPERSCALAR PROCESSOR

CROSS-REFERENCE TO RELATED APPLICATIONS

The present application is related to applications Ser. No 09/263,667, entitled "An Instruction Buffer Arrangement for a Superscalar Processor", filed Mar. 5, 1999; Ser. No. 09/263,669, entitled "A Simplified Method to Generate BTAGs in a Decode Unit of a Processing System", filed Mar. 5, 1999 Ser. No. 09/263,664, entitled "Decode Scheme for the Optimization of Accessing Constrained or Volatile Storage", filed Mar. 5, 1999, Ser. No. 09/263,666, entitled "Destructive Operation Optimization for Operations Which Modify Partial Datums", filed Mar. 5, 1999; Ser. No. 09/263,670, entitled "Fast Microcode/Branch Selector Scheme", filed Mar. 5, 1999; and Ser. No. 09/263,668, entitled "A System and Method for Utilizing a Conditional Split for Aligning Internal Operations (IOPs) for Dispatch", filed Mar. 5, 1999.

FIELD OF THE INVENTION

The present invention relates generally to a superscalar processor and more particularly to instruction buffers in such a processor which provides dispatch groups that span fetch boundaries and has complex decode characteristics.

BACKGROUND OF THE INVENTION

Superscalar processors employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window beyond the dispatch boundary. To enable concurrent execution of instructions, the execution engine is composed of many parallel functional units. The fetch engine speculates past multiple branches in order to supply a continuous instruction stream to the decode, dispatch and execution pipelines in order to maintain a large window of potentially executable instructions.

The trend in superscalar design is to scale these techniques: wider dispatch/issue, larger windows, more physical registers, more functional units, and deeper speculation. To maintain this trend, it is important to balance all parts of the processor-any bottlenecks diminish the benefit of aggressive techniques.

Instruction fetch performance depends on a number of factors. Instruction cache hit rate and branch prediction accuracy have been long recognized as important problems in fetch performance and are well-researched areas.

Modem microprocessors routinely use a plurality of mechanisms to improve their ability to efficiently fetch past branch instructions. These prediction mechanisms allow a processor to fetch beyond a branch instruction before the outcome of the branch is known. For example, some mechanisms allow a processor to speculatively fetch beyond a branch before the branch's target address has been computed. These techniques use run-time history to speculatively predict which instructions should be fetched and eliminate "dead" cycles that might normally be wasted. Even with these techniques, current microprocessors are limited in fetching instructions during a clock cycle. As superscalar processors become more aggressive and attempt to execute many more instructions per cycle, they must also be able to fetch many more instructions per cycle.

High performance superscalar processor organizations divide naturally into an instruction fetch mechanism and an instruction execution mechanism. The fetch and execution mechanisms are separated by instruction issue buffer(s), for example, queues, reservation stations, etc. Conceptually, the instruction fetch mechanism acts as a "producer" which fetches, decodes, and places instructions into a reorder buffer. The instruction execution engine "prepares" instructions for completions. The completion engine is the "consumer" which removes instructions from the buffer and executes them, subject to data dependence and resource constraints. Control dependencies (branches and jumps) provide a feedback mechanism between the producer and consumer.

As instruction fetch decode and dispatch pipelines become wider, it becomes important to optimize the translation from the complex instruction set with a large amount of implicit information to an explicit instruction set that does not require the use of architected registers. This is particularly true in situations where the internal instructions do not have a direct one to one relationship to the external instructions. This is typically done to facilitate faster cycle times, simplify design, or reduce the execution and/or register resources required for that instruction's execution.

Accordingly, what is needed is a mechanism for forming dispatch groups which span fetch boundaries. More particularly, what is needed is a systematic method of determining which instructions can be grouped together or not for a dispatch group and where in the dispatch slots they should reside without examining the instruction itself within the decode unit. This is sometimes done for branch instructions in processors, but that is a specialized case and not generally applied. The present invention addresses such a need.

SUMMARY OF THE INVENTION

A method and system for determining if a dispatch slot is required in a processing system is disclosed. The method and system comprises a plurality of predecode bits to provide routing information and utilizing the predecode bits to allow instructions to be directed to specific decode slots and to obey dispatch constraints without examining the instructions.

The purpose of this precode encoding system scheme is to provide the most information possible about the grouping of the instructions without increasing the complexity of the logic which uses this information for decode and group formation. In a preferred embodiment, predecode bits for each instruction that may be issued in parallel are analyzed and the multiplexer controls are retained for each of the possible starting positions within the stream of instructions.

DESCRIPTION OF THE INVENTION

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A superscalar processor includes a number of stages, such as the following, in the processor pipeline. In a typical first stage, referred to as an instruction fetch stage, an instruction is fetched from memory or associative memory structure, each stage including one or more pipelines. Then, in decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 1:
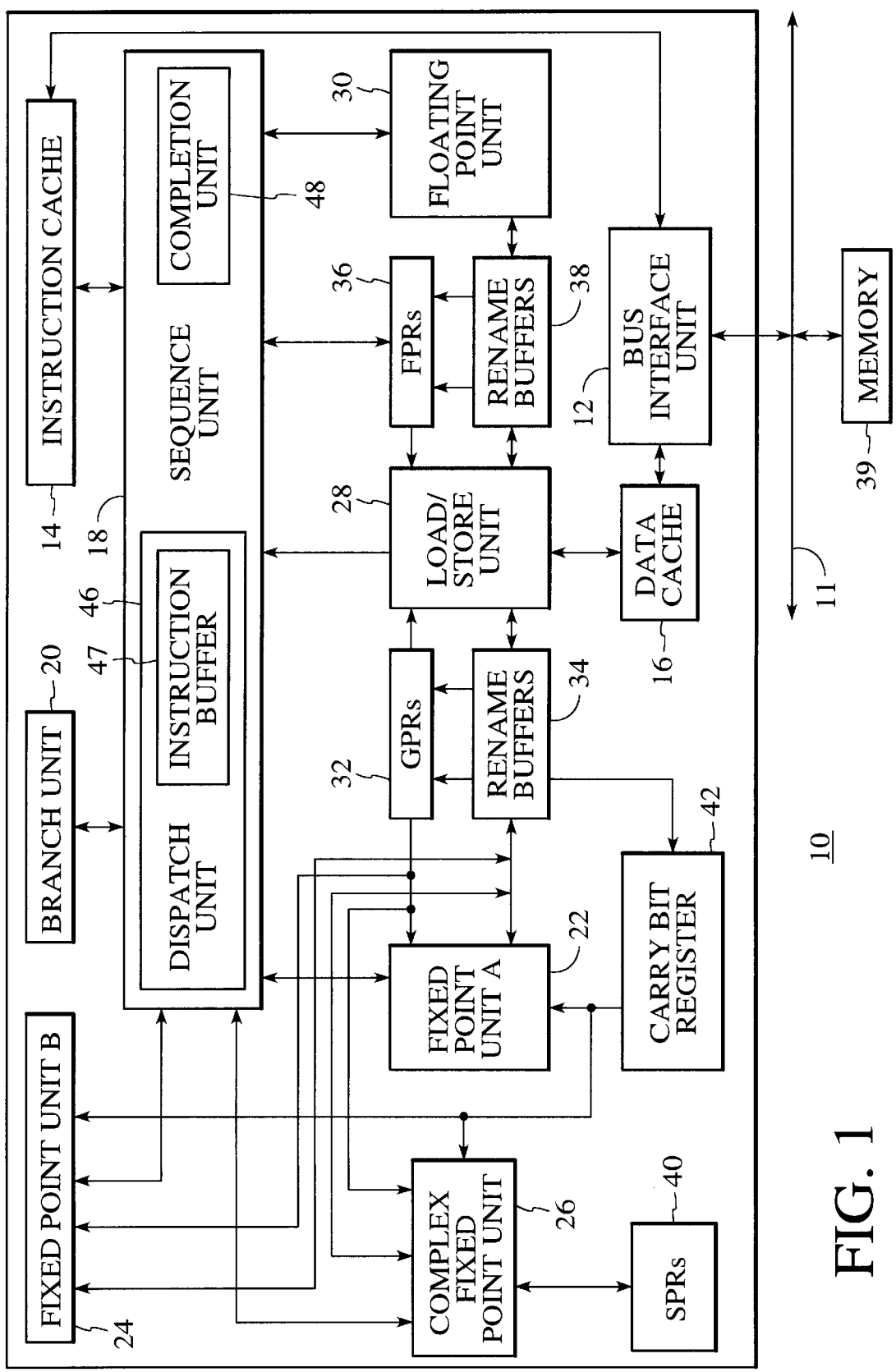
FIG. 1 is a block diagram of a conventional superscalar processor.

FIG. 1 is a block diagram of a conventional superscalar processor 10. As shown, the superscalar processor 10 typically include a system bus 11 connected to a bus interface unit ("BIU") 12. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

As is seen, the above-identified processor utilizes rename buffers and special purpose registers (SPRs) as a rename pool to keep track of the instructions. This use of a rename pool adds considerable complexity to the superscalar process, particularly as instructions become wider. To index instructions properly, it becomes important to optimize the translation from the complex instruction set with a large amount of implicit information to an explicit instruction set that does not require the use of architected registers. This is particularly true in situations where the internal instructions do not have a direct relationship to the external instructions. Hence, to index instructions properly, it is sometimes important to break those instructions into two instructions or several instructions that may not have a direct relationship to the original instruction to allow for faster execution of such instructions. Accordingly, a unique superscalar processor is provided which removes the rename buffering scheme and replaces it with a rename mapping arrangement.

Figure 2:
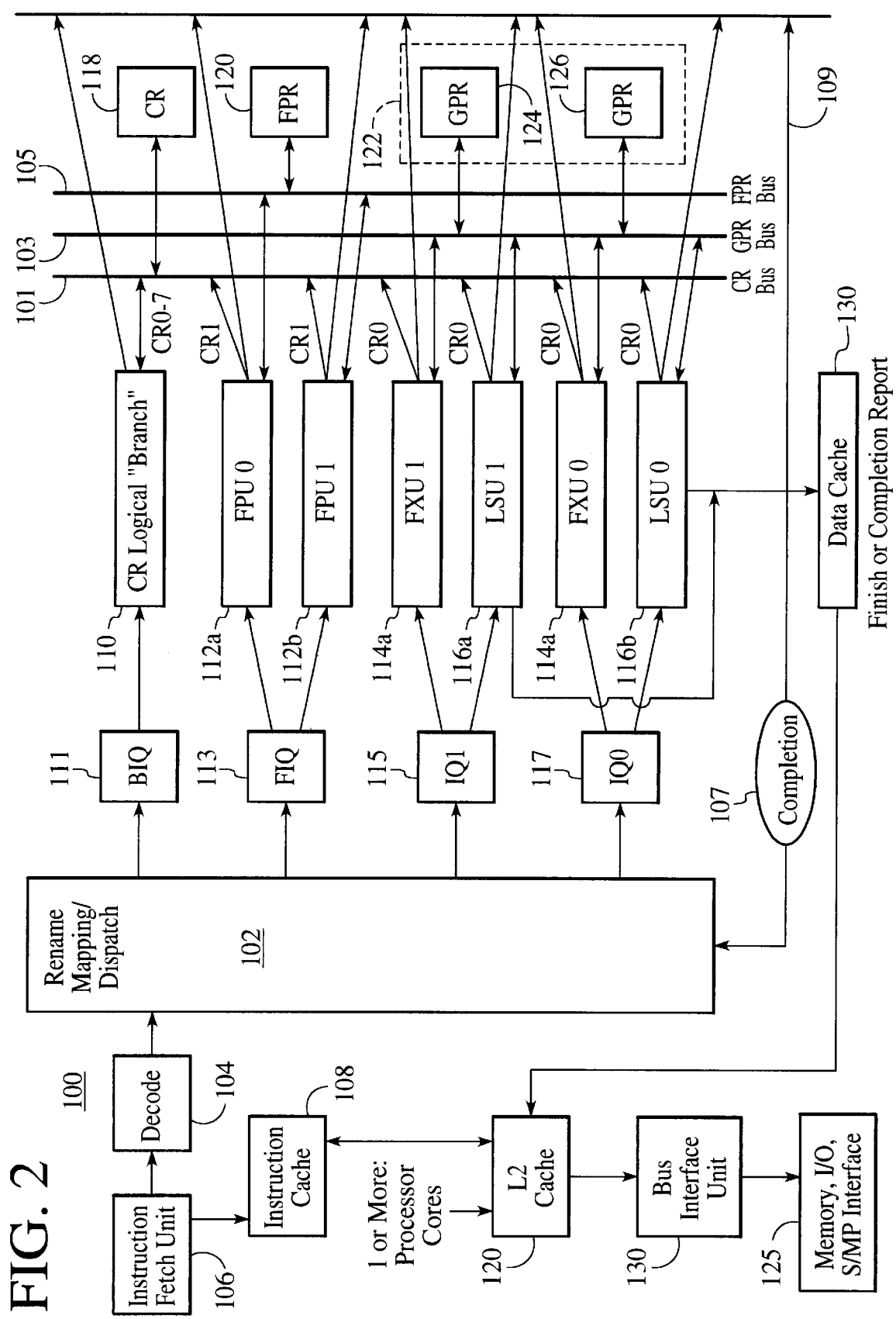
FIG. 2 is a block diagram of a superscalar processor in accordance with the present invention.
Figure 3:
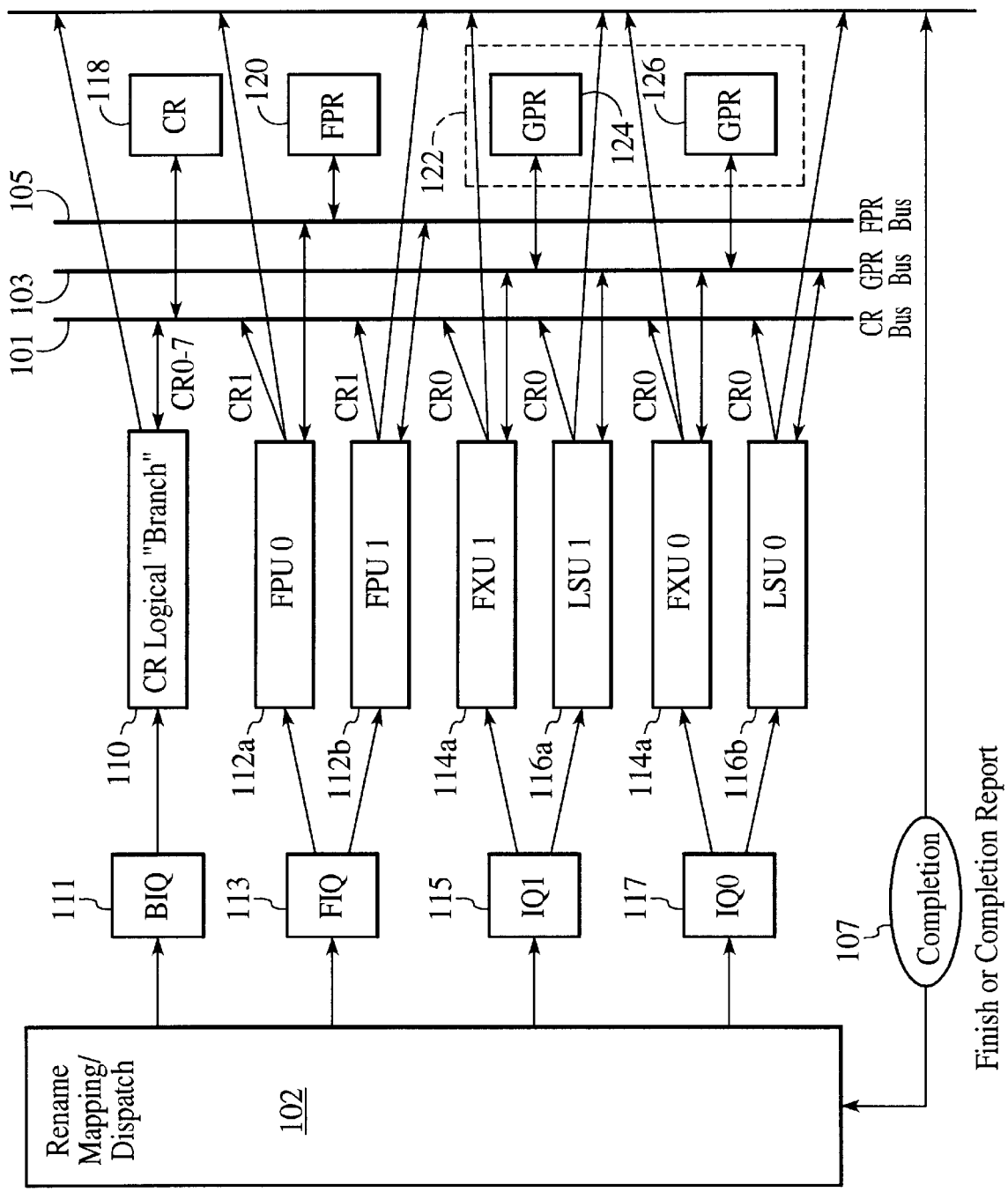
FIG. 3 is an enlarged block diagram illustrating certain portions of the superscalar processor of FIG. 2.

FIG. 2 is a simple block diagram of a superscalar processor 100 in accordance with the present invention. FIG. 3 is an enlarged block diagram illustrating certain portions of the superscalar processor of FIG. 2. The processor includes an instruction fetch unit (IFU) 106 which provides signals to a decode unit 104 which utilizes a rename mapping structure 102. That rename mapping structure 102 provides information directly to issue queues 111–117. The issue queues 111, 113, 115 and 117 in turn feed the execution units 110, 112a–b, 114a–b, and 116a–b.

Instruction cache 108 stores instructions received from the IFU 106. Data cache 130 receives data from the execution units 110–116. A level 2 (L2) cache 120 is utilized to store data and instructions from the data cache 130 and the instruction cache 108. The processor 100 includes a bus interface unit (BIU) 130 which passes information between the L2 cache 120 and the peripheral device interface 125 (i.e., memory, i/o device, mp).

In this embodiment, the branch issue queue (BIQ) 111 provides information to the condition register (CR) logical or branch unit 110. The floating point issue queue (FIQ) 113 provides information to the two floating point units (FPUs) 112a and 112b. Issue queue (IQ) 115 provide information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes, that the issue queues can be arranged in a different manner and that arrangement would be within the spirit and scope of the present invention.

Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing in a preferred embodiment conditional registers 0–7 (CR0–7). FPU 112a and FPU 112b provides information to CR 118 via CR bus 101, utilizing in a preferred embodiment conditional register 1. FPU 112a and 112b also receive and provide information from and to FPR pool 120 via FPR bus 105. FXU 114a, FXU 114b, LSU 116a, LSU 116b output results to CR 118 via CR bus 101, utilizing in a preferred embodiment, conditional register 0. FXU 141a, FXU 146, LSU 116a and LSU 116b also receive and provide information from and to GPR pool 122 via GPR bus 103. GPR pool 122 in a preferred embodiment is implemented utilizing a shadow GPR arrangement in which there are two GPRs 124 and 126. All of the execution units 110–116 provide results to the completion unit 107 via completion bus 109.

Accordingly, with the processor in accordance with the present invention, increased throughput at higher instruction rates can be accomplished through an efficient accessing and translating of the instruction set associated with the processor.

To take full advantage of the operation of the processor 100 several features of the processor are optimized to allow for wider instruction fetches and dispatches while minimizing cycle time and the like. The instruction cache 108 fetches very wide data, for example, 8 instructions per cycle. In order to achieve the highest possible frequency the instruction cache 108 does not align the instruction data based upon the starting address.

In accordance with the present invention, an instruction buffer 300 is provided which can form dispatch groups spanning fetch boundaries while minimizing control complexity and wiring congestion within the processor. The instruction buffer, which in a preferred embodiment allows up to eight instructions to be loaded per cycle, any aligned group of four empty entries to be compressed out of the queue is within the decode unit 104, and allows advancing the buffer either zero entries, four entries, or eight entries per cycle (a fractional portion of the fetch width).

An example of this type of instruction buffer is described in copending U.S. patent application Ser. No. 09/263,667, entitled "An Instruction Buffer Arrangement for a Superscalar Processor," assigned to the assignee of this application and filed on even date herewith and is incorporated by reference herein.

In order to improve performance in microprocessors, certain information is provided in addition to the instruction. This information which is called pre-decode bits is often held in the cache as an appendage to the instructions. Cycle time is critical in the stage which reads and routes instruction FIFO contents to a variety of specialized decode slots. Because this routing is non-trivial an improved pre-decode means is needed. The present invention provides a novel set of precode bits that optimally provide pre-decode information with the use of a few bits.

The purpose of this scheme is to provide the most information possible about the instructions without increasing the complexity of the logic which uses this information.

The present invention describes a method which using a very limited number of predecode bits can completely determine what dispatch slot is required for a particular instruction and formulate the proper dispatch groups prior to examining the instructions. As a matter of extending the application, in a system with multiple levels of instruction cache hierarchy the shared instruction/data cache would not contain the predecodes at all, the instruction cache would contain the predecode bits as prescribed in this invention, and the instruction fetch queue could include the actual decode routing controls as computed during the fetching of the instructions from the predecode bits. Alternatively, the actual controls required to direct instructions to the proper decode slots could be computed as instructions are read out of the instruction fetch queue.

The meaning of the four bits used to provide the precode information is provided below as a BSFL code where:

B—Branch: (if L='1' it is an unconditional branch, otherwise it is a conditional branch)

S—Split: (The instruction will form two IOPs)

F—First: (The instruction must occupy the first decode slot)

L—Last: (No instruction can follow this instruction in the group)

Figure 4:
FIG. 4 illustrates a table which maps the BSFL code to a particular instruction.

FIG. 4 illustrates a table which maps the above-identified BSFL code to a particular type of instruction.

Cycle time is critical in the stage which reads and routes instruction buffer 300 contents to a variety of decode slots 316—324. As this routing function is complex, copies of routing information can be generated such that if a given slot (slot 0) is selected (and the subsequent N slots), slot M can provide all routing information for the next N slots. This requires that as the data was read into the instruction buffer 300, these controls were computed and stored.

Figure 5:
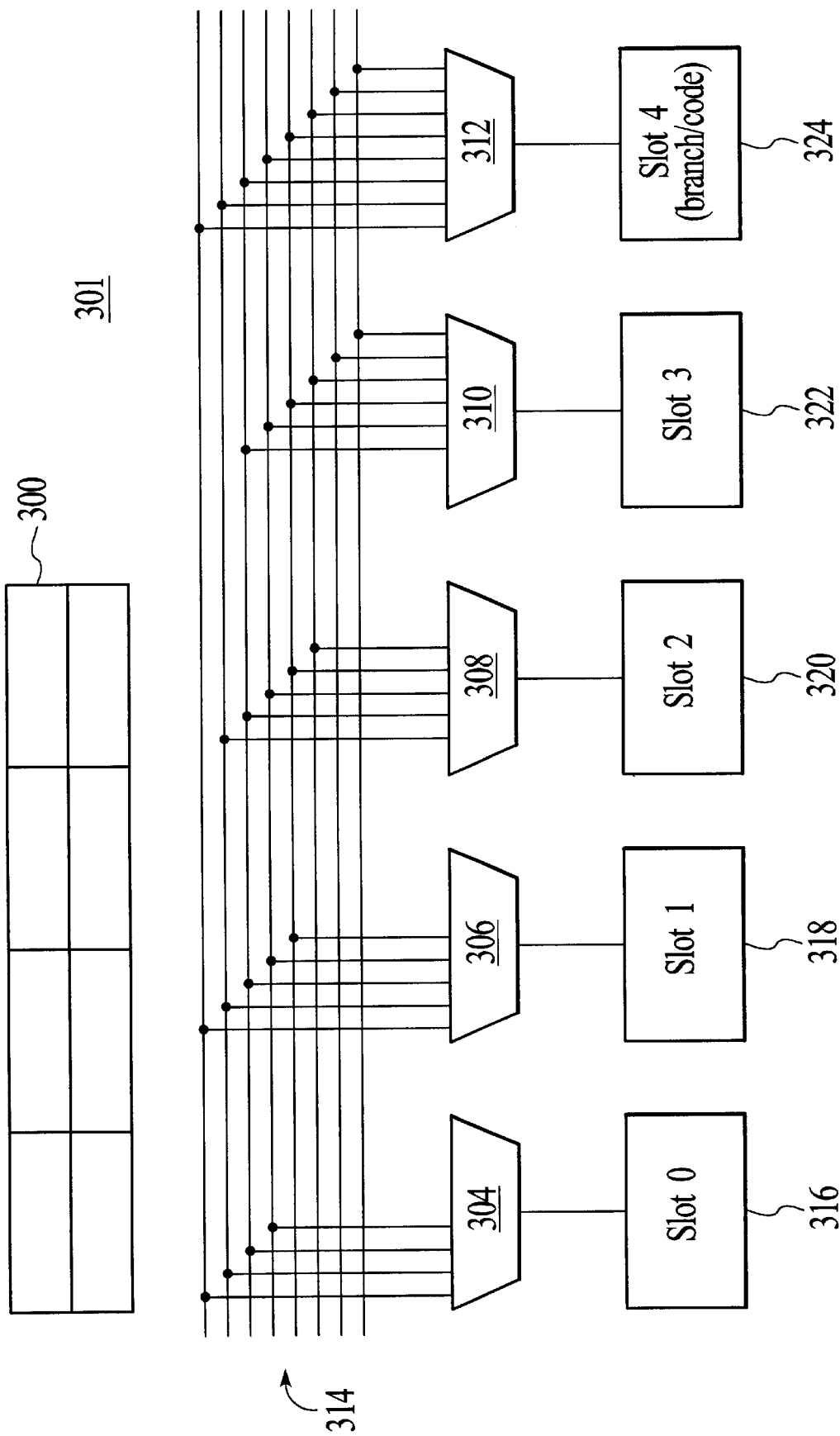
FIG. 5 is an illustration of a multiplexer arrangement.

FIG. 5 illustrates a five multiplexer arrangement 301 in accordance with the present invention which utilizes this predecoded information to optimize the fetching of instruction. The multiplexer arrangement includes the instruction buffer 300 which provides instructions to multiplexers 304–312 via wiring lines 314. The multiplexers are coupled to slots 316–324. Computation of the appropriate multiplexer controls are made as the instruction buffer 300 is filled. A distinct set of controls (not shown) are generated for each index into the instruction buffer 300. Each set of controls is appropriate for each of the possible instructions which can be read out if an access starts with that address.

The purpose of this precode encoding system scheme is to provide the most information possible about the grouping of the instructions without increasing the complexity of the logic which uses this information for decode and group formation. In a preferred embodiment, pre-decode bits for each instruction that may be issued in parallel are analyzed and the multiplexer controls are retained for each of the possible starting positions within the stream of instructions.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining if a dispatch slot is required in a processing system comprising:

providing a plurality of predecode bits to provide routing information; and utilizing the predecode bits to allow instructions to be directed to specific decode slots and to obey dispatch constraints without examining the instructions.

2. A method for determining if a dispatch slot is required in a processing system comprising:

providing a plurality of predecode bits, the plurality of predecode bits provided as a four bit branch, split, first and last (BSFL) code, to provide routing information; and utilizing predcode bits to allow instructions to be directed to specific decode slots and to obey dispatch constraints without examining the instruction.

3. The method of claim 2 in which controls for dataflow are generated for the predecode bits and stored in an instruction buffer thereby eliminating latency after reading instructions from the instruction buffer.

4. The method of claim 3 wherein many complex asymmetries are supported in decode/dispatch without imposing complexity.

5. A method for determining if a dispatch slot is required in a processing system comprising:

provopriding a plurality of predecode bits, the plurality of predecode bits provided as a four bit branch, split, first and last (BSFL) code to provide routing information, each bit of the four bit BSFL code mapped to a particular type of instruction; and utilizing the predecode bits to allow instructions to be directed to specific decode slots and to obey dispatch constraints without examining the instruction.

* * * * *